United States Patent [19]
Reynolds

[11] 3,733,961
[45] May 22, 1973

[54] CONTROL FOR MILLING MACHINES AND THE LIKE

[75] Inventor: William B. Reynolds, Albuquerque, N. Mex.

[73] Assignee: Automation Systems, Incorporated, Albuquerque, N. Mex.

[22] Filed: Aug. 24, 1970

[21] Appl. No.: 66,195

[52] U.S. Cl. .................90/21 R, 90/13 C, 318/467
[51] Int. Cl. ...............................................B23c 9/00
[58] Field of Search ..................90/21 R, 58, 13 R, 90/13 C; 51/240 R; 318/467, 162, 626

[56] References Cited

UNITED STATES PATENTS

| | | | |
|---|---|---|---|
| 3,474,315 | 10/1969 | Tamaki et al. | 318/162 |
| 2,782,348 | 2/1957 | Luhn | 90/21 X |
| 3,564,957 | 2/1971 | Markgraf | 318/162 X |
| 3,339,427 | 9/1967 | Moseley | 74/848 |

FOREIGN PATENTS OR APPLICATIONS

753,176   7/1956   Great Britain..........................90/21

*Primary Examiner*—Gil Weidenfeld
*Attorney*—McGrew and Edwards

[57] ABSTRACT

An automatic control system for application to conventional machine tools utilizes readily adjustable limit switches and guide assemblies for the switches for attachment to the machine and utilizing a flexible rod for facilitating operation without precision mounting. The circuitry is mounted in a portable control panel or console and each of the limit switches may be plugged interchangeably into any of a plurality of sequence circuits. The speed and direction of motors actuating the feed screws of the machine are controlled by individual selectors for each sequence circuit. Toggle switches, one for each sequence circuit, are provided to select optional activities within the circuit. Rotary vernier limit switches are provided for connection as the limit switch in any one of a series of selected successive operations of the sequence circuits to obtain precise stop points in the operation of the machine.

15 Claims, 18 Drawing Figures

INVENTOR
WILLIAM B. REYNOLDS
ATTORNEYS

INVENTOR
WILLIAM B. REYNOLDS
BY
ATTORNEYS

CONTROL FOR MILLING MACHINES AND THE LIKE

This invention relates to control systems for machine tools and particularly to an improved automatic control adapted for ready detachable mounting on and control of milling machines and the like.

There are many applications of machine tools in which it is desired to operate the machine repeatedly to produce substantial numbers of duplicate parts. Many uses of machine tools also make it desirable to provide automatic controls which enable an operator to set the machine in operation and then perform other tasks while the automatic control completes the operation on a workpiece. Automatic equipment for such purposes has been known and used heretofore, but has not been suited to all applications. For example, in a small machine shop the purchase and use of a completely automatic milling machine may not be warranted because many operations do not require the multiple production of large members of the same piece; furthermore, several different machines in the shop may be required to operate to produce numbers of duplicate pieces but are not required for such operations for a substantial part of the time. Thus it became desirable to provide a control system which can, if desired, be installed to operate on a number of different machines and can be installed and removed readily. Accordingly, it is an object of this invention to provide an improved automatic sequencing control for mounting on milling machines and the like.

It is another object of this invention to provide an automatic control system for milling machines including an improved arrangement for facilitating the mounting of the control on the machine without structural changes of the machine.

It is another object of this invention to provide an improved control system for milling machines and the like which may be interchangeably used on a plurality of machines and which is easily mounted and readily moved from one machine to another.

It is a further object of this invention to provide an automatic control system for milling machines and the like including limit switches actuated by movement of the feed mechanism of the machine and which is effective for precision operation without precise alignment of the limit switch actuating structure on the machine.

It is a still further object of this invention to provide an automatic control system for milling machines and the like including an improved arrangement for facilitating the mounting of the system and the machine and for affording ready removal from the machine and mounting on another machine.

Briefly, in carrying out the objects of this invention, in one embodiment thereof, a control system is provided which includes a motor drive unit for the feed screw of each carrier or table of the machine, the shaft of each drive unit is arranged to be secured to the respective feed screw in alignment therewith and to thereby support the unit on the feed screw shaft. Rotation of each unit about its shaft is prevented by a torque arm attached to the part of the machine on which the feed screw is mounted. Limit switches are provided to control the length of movement along each feed path; the limit switches are mounted on a guide member bolted or otherwise secured to the feed screw support member. A slide mounted on the guide member carries limit switch actuating members and the slide is attached to the machine table or other member driven by the feed screw for movement therewith, a flexible rod extending in general alignment with the guide being employed for this purpose. The rod affords accurate operation of the switch regardless of inaccurate alignment of the guide. A portable control console is provided and includes the cycling or sequencing circuitry of the system, provision being made for a multiplicity of sequential steps in the machine operating cycle. Flexible leads from the limit switch are provided with terminal plugs for the connection of each switch in a selected respective one of the sequencing steps of the circuit. A rotary vernier switch to be actuated by a device attached to the feed screw is provided to act as a limit switch to terminate operation of a step in the cycle at a precise position.

The features of novelty which characterize this invention are pointed out with particularity in the claims annexed to and forming a part of this specification. The invention itself, however, both as to its organization and method of operation, together with further objects and advantages thereof, will best be understood upon reference to the following description taken in connection with the accompanying drawings in which:

By way of example, the invention is described herein as applied to a milling machine and control utilizing electric feed drive motors, it will readily be apparent, however, that machines using other motors, such as hydraulic or fluid motors, may be provided with and controlled by applicant's system.

Figure 1:
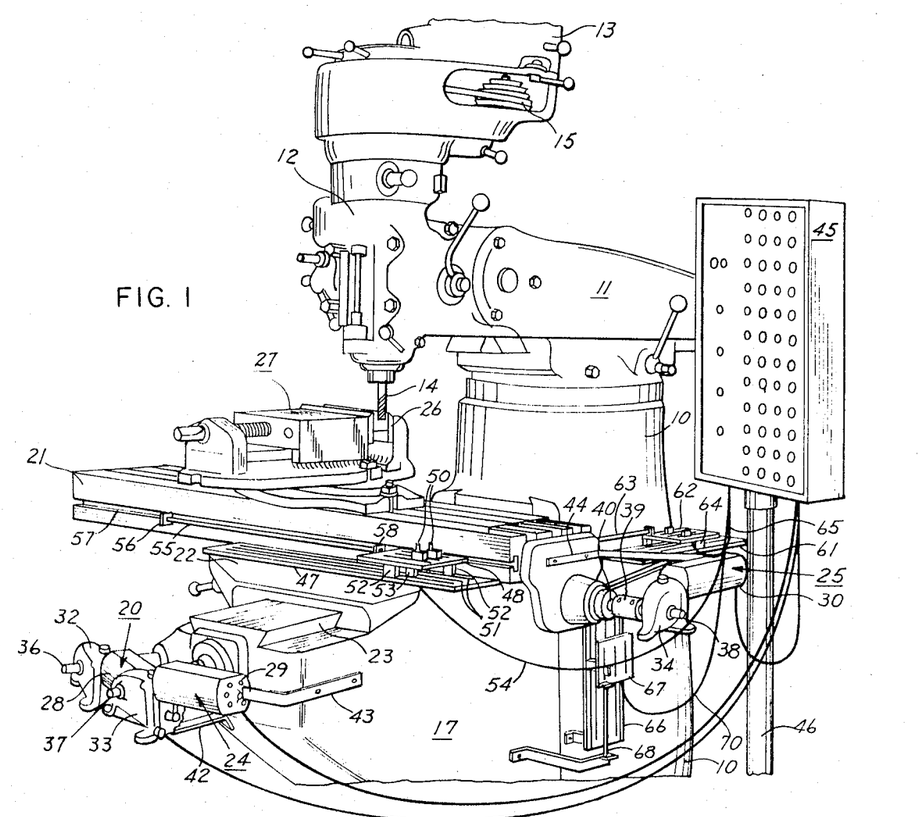
FIG. 1 is a perspective view of the upper portion of a milling machine of the vertical type having mounted thereon a control system embodying the invention.

Referring now to the drawings, the milling machine shown in FIG. 1 comprises a stationary base 10 having a tool drive assembly 11 mounted on the top thereof. The tool drive assembly comprises a head 12 on which is mounted a motor 13 for driving a vertical cutting tool or milling cutter 14 through an adjustable speed belt and pulley drive 15. A vertically movable main carrier member 17 is slidably mounted on the base 10 on a vertical guide track 18 and may be moved by rotation of a pair of feed screws (not shown) rotatably mounted on a lower portion of the base 10 having threads engaging the member 17, the vertical feed screws being driven by a motor assembly 20. A work table or carrier 21 mounted on a cross feed member 22 is carried on the member 17 and is movable in the cross feed direction on a transverse guide 23, the movement being effected by rotation of a feed screw (not shown) driven by a motor drive unit 24. The table 21 is similarly movable with respect to the member 22 by rotation of a feed screw (not shown) which is driven by a motor assembly 25. The machine tool comprising the base 10 and the carrier members movable by operation of feed screws is a conventional machine and its mode of operation is well understood in the art. Further mechanical details of the milling machine have not been illustrated as they are not essential to an understanding of the present invention.

A workpiece indicated at 26 is mounted on the table 21 in a work holding or vise structure 27 in the usual manner. By operating the milling cutter 14 and moving the table 21 in selected directions, the cutter is guided over the workpiece 26 to perform the desired milling operation. The motor drive units 20, 24 and 25 comprise high speed motors indicated at 28, 29 and 30, respectively, and gear type speed reducers indicated at 32, 33 and 34, respectively. These motors are each provided with an automatic brake (not shown) which stops rotation of the motor when it is de-energized. The shafts of the speed reducers are connected to the respective feed screws, these shafts are shown protruding from the speed reducers at 36, 37 and 38, respectively.

In the illustrated embodiment of the invention, the motor drive units 20, 24 and 25 have been shown connected directly to the feed screws and replacing the conventional hand cranks. The coupling between the feed screw and the gear reducer in each case is a precision coupling machined to accommodate the feed screw shaft at one end and the reducer drive shaft at the other. The coupling is split longitudinally and provided with clamping screws whereby it may be tightened securely to both the feed screw shaft and the reducer shaft and when tightened will hold the shafts in correct alignment. This construction facilitates the quick attaching and detaching of the motor units and the feed screws. One of the couplings is illustrated in FIG. 1 connecting the drive shaft 38 of the motor unit 25 to the feed screw shaft for the table 21, indicated at 40, the coupling being indicated at 39. Each of the motor units 20, 24 and 25 is thus securely mounted on its respective feed screw shaft and, in order to prevent rotation of the motor unit, each unit is provided with a torque arm securely attached to the adjacent portion of the machine with respect to which the respective feed screw moves the corresponding carrier member. These torque arms for the motor drive units 20, 24 and 25 are indicated at 42, 43 and 44, respectively. Each of the torque arms is mounted on the carrier member in which its respective feed screw is rotatably mounted, the arms 42 and 43 being connected to the carrier unit 17 and the arm 44 to the table 21.

In order to control the movement of the milling cutter 14 and workpiece 26 with respect to one another, limit switches are provided to stop the operation of the motor units 20, 24 and 25. The units 25 and 24 effect movement in a horizontal plane from right to left and forward and back, respectively — the axes of these movements being designated the X-axis and Y-axis, respectively. The unit 20 effects vertical movement along a third axis designated the Z-axis.

The sequence of operation of the feed drive motors is controlled by circuits within a portable console 45 supported on a stand including an upright column 46.

A guide assembly for carrying the limit switches and for selecting their positions of operation is provided for each motor unit and is located to move switch actuators along paths parallel to the respective axes of movement of the table 21 and the other carrier members 17 and 22. The guide assembly for the X-axis limit switches comprises a rectangular guide plate 47 secured to the carrier 22 and in alignment with the path of movement of the table 21. A switch actuator carriage 48 is slidably mounted on the plate 47 and is provided with switch actuators 50 supported in alignment with respective switch positioning slots 51 in the plate. The carriage 48 is supported on and spaced from the plate by three posts 52 one at the middle in front and the other two at the rear corners and which slidably engage tracks comprising rods secured to the plate along its edges. The limit switches are attached to the plate along respective ones of the slots 51 in the path of movement of the actuators 50. One limit switch of the microswitch type is illustrated at 53 and is connected to the control console by a flexible lead or cable 54.

The slide 48 is moved along the plate 47 by movement of the table transmitted through a flexible rod 55 secured to the table at its left-hand end on a bracket 56 attached in the front side T-slot of the table indicated at 57. The right-hand end of the rod is attached to the slide 48 by a bracket 58. The slide is constrained to move along the plate in parallel alignment with the slots in the plate; the flexible rod 55 facilitates the mounting of the guide on the machine because it allows some misalignment of the guide with the path of movement of the table 21 so that high precision in mounting the plate on the machine is not essential. The slide thus tracks independently of the machine tool slide and in proportion to its movement.

The Y-axis limit switches are mounted on a guide assembly of the same construction as the X-axis assembly just described. This assembly comprises a plate 61 mounted on the carriage member 17, a slide 62 on the plate and a flexible rod 63 connecting the slide to the Y-axis carrier 22. A limit switch 64 is connected to the console 45 by a flexible lead 65. Similarly the Z-axis guide assembly comprises a plate 66 mounted on the base 10, slide 67 on the plate and driven by a rod 68 attached to the carrier 17 and a limit switch connected to the console by a lead 70.

Figure 2:
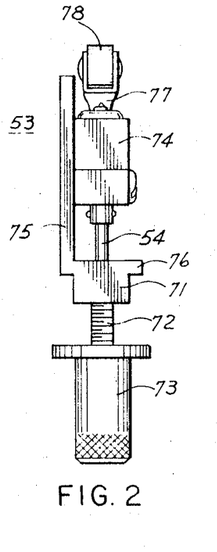
FIGS. 2 and 3 are end and side elevation views, respectively, of a limit switch and mounting employed in the system.
Figure 3:
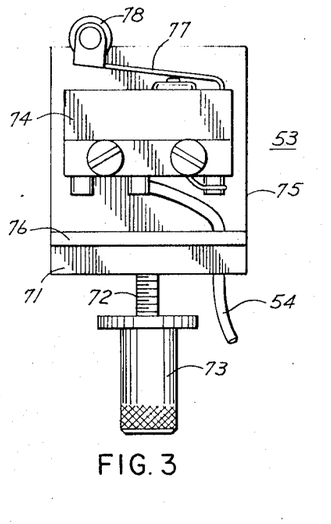

The plates of the several guide assemblies are provided with a sufficient number of slots for locating the desired number of limit switches, one or more mounted in each slot. Only one limit switch at a time is prepared for actuation depending upon the sequencing connections made in the control console 45. The manner in which the limit switches are mounted in the slots of the guide assemblies is shown in FIGS. 2 and 3, which, by way of example, are enlarged views of the microswitch 53 of the assembly 47. Each microswitch assembly includes a base 71 having a threaded rod 72 extending downwardly therefrom and carrying a clamping member 73 threaded on the post 72. A microswitch 74 is mounted on a plate 75 machined as an integral part of the base 71 so that the bottom edge of the plate and the bottom edge of an extending shoulder 76 on the base 71 are in alignment to engage the top side of the plate 47 while the base 71 extends into the slot, the member 73 is then tightened against the lower side of the base 47 to secure the microswitch assembly in the selected position. The microswitch 74 is arranged to be actuated by a spring arm 77 having a roller cam 78 positioned for engagement by the actuating element 50. The electrical circuit for the switch is completed from the lead 54 through the switch to the metal parts of the assembly plate 75 and base 71 to the plate 47 which is in electrical conducting relationship with the grounded machine base.

Figure 4:
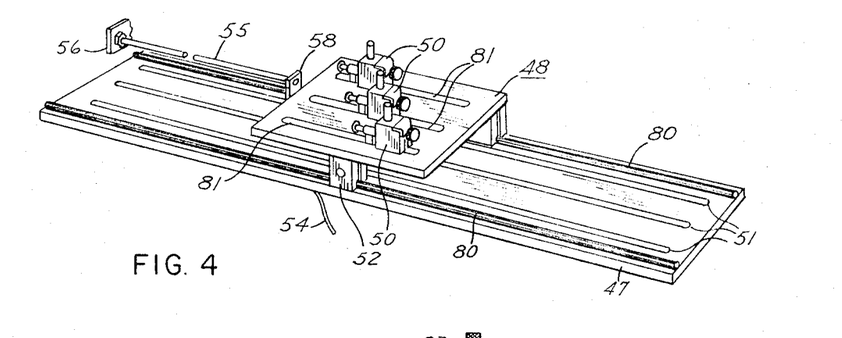
FIG. 4 is a perspective view of a mounting and guide assembly for the limit switches.
Figure 5:
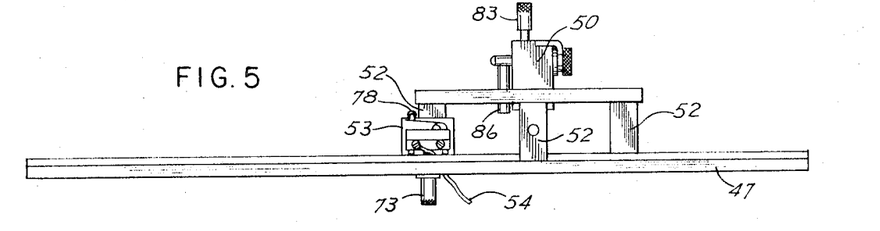
FIG. 5 is a side elevation view of the assembly of FIG. 4.
Figure 6:
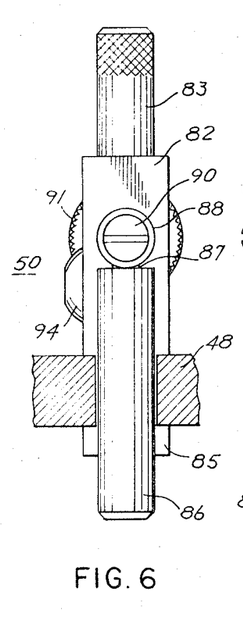
FIGS. 6, 7 and 8 are, respectively, front, side and rear elevation views of one of the limit switch actuators employed with the assembly of FIG. 4.
Figure 7:
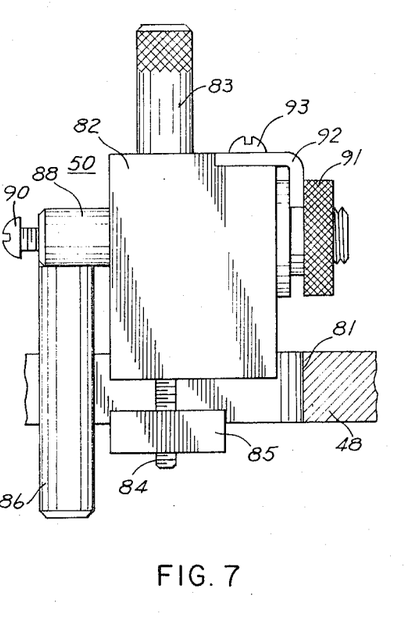

The construction and mounting arrangement of the guide assemblies is more fully illustrated in FIGS. 4 and 5 which are views of the assembly for the X-axis. As shown in these views, the posts 52 engage the track rods indicated at 80. The posts are split upwardly from their bottom ends where they conform to and embrace the rods and have clamping screws for adjusting them with respect to the rods. The switch actuating members 50 mounted on the plate 48 are arranged in individual slots 81 formed in the plate 48 and which are parallel to the slots 51 in the plate 47. The slots 81 provide for the adjustment of the positions of the member or actuator 50 so that the actuation point for the microswitch can be adjusted closely. The construction of the switch actuators 50 is shown in the enlarged views, FIGS. 6, 7 and 8. Each actuator 50 comprises a block 82 of rectangular configuration having a clamping knob 83 to which is attached a vertically extending screw 84 carrying a clamping block 85 which fits in the slot 81 as clearly shown in FIG. 8. The actuator assembly may thus be clamped in position along the slot 81 as desired. The actuating element comprises a short rod or stub shaft 86 which extends downwardly through the slot 81 into the path of the microswitch actuator roller 78.

Figure 8:
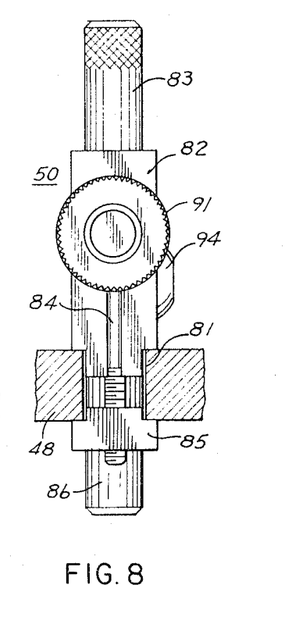

The shaft 86 is reduced at the top as indicated at 87 and enters a hole in a cross shaft 88 and is locked in position by a set screw 90. The shaft 88 may be moved slightly longitudinally by turning a thumb screw 91 which is threaded on the threaded right-hand end of the shaft 88. The thumb screw 91 is held in position against axial movement by a retaining lug 92 secured to the top of the block 82 by a machine screw 93. The actuator assembly may thus be locked in position in the slot of the plate 48 close to the exact position desired and thereafter the position of the rod 86 in the slot may be adjusted slightly to provide actuation of the microswitch at the exact point desired. In order to lock the shaft 88 in the actuator block securely in its selected position, the block is provided with a split lower portion with substantial spacing as indicated in FIG. 8 and the two halves of this portion may be clamped by a set screw 94 to prevent movement of the shaft 88.

Figure 9:
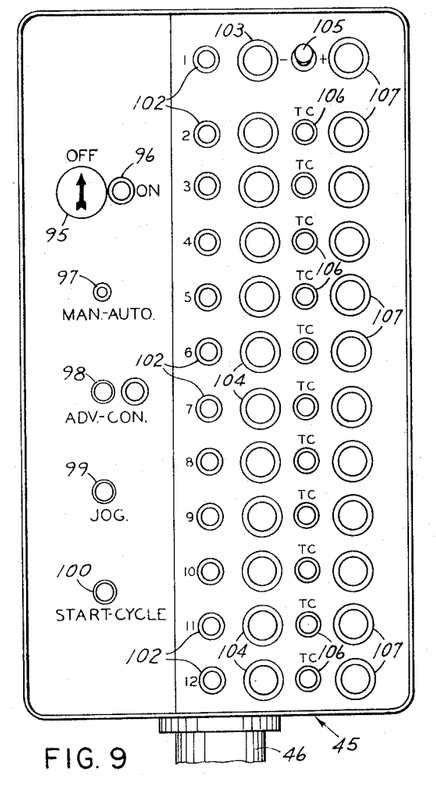
FIG. 9 is a front elevation view of the front panel of the portable control console of FIG. 1.

The control system circuits arranged in the console 45 provide a wide range of operation by the simple procedure of setting dials and switches and plugging in the required limit switches to control the motors 28 to 29 and 30, the lead wires of which are also plugged into the console. The front panel of the console is illustrated in FIG. 9 and has mounted thereon a dial 95 for operating the main power supply switch and a pilot light indicator 96 which is lighted when the switch is turned to its on position. Below the power switch 95 there are arranged a toggle switch 97 and three push button switches 98, 99 and 100. A vertical row of twelve pilot lights is arranged to the right of the power switch.

Figures 10, 11:
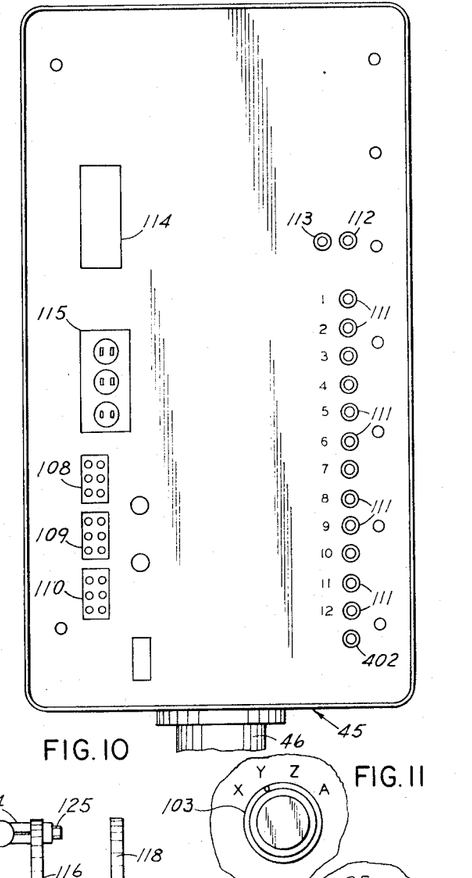
FIG. 10 is a rear elevation view of the control panel of FIG. 1.
FIGS. 11, 12 and 13 are enlarged views of control knobs employed on the front panel of the console of FIG. 9.
Figures 12, 13:
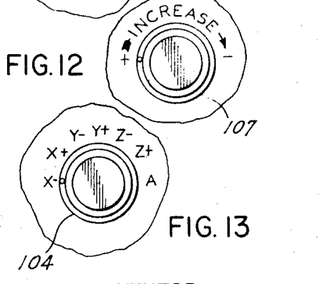

These lights are turned on one at a time to indicate which of the twelve steps of the sequence control is active. To the right of the pilot lights 102 there is a row of dials which are the switching dials for the feed motors. The first of these dials at the top, indicated at 103, is a four position dial, the first three positions for selecting one of the three motors and the fourth a position utilized when connecting accessories or auxiliary apparatus for operation. An enlarged view of the dial 103 is shown in FIG. 11 which indicates the four positions of the dial. Below the dial 103 there are eleven dials 104 which, as shown in FIG. 13, are selectors for determining the motor to be employed, that is, the axis of movement of the machine, together with the direction of the motor indicated as "+" or "−" and also a seventh position which is the accessory or auxiliary equipment position for the respective step in the sequence of operations.

To the right of the motor selector dials 103 and 104, there is a column of toggle switches, the top switch indicated at 105 being a switch to determine the direction of rotation of the motors selected by the switch 103. The toggle switches below the switch 105 and indicated by 106 are three-position toggles, the center position being an open switch condition for the respective step in the series which is used for a tool change or interruption position, the left-hand "continue" position which is a position employed for automatic continuation of a step by step operation, and the right-hand position which is used for initiating the operation of accessory equipment at that respective cycle step.

The final column of dials on the right-hand side of the panel, as shown in FIG. 9, are the motor speed adjusting dials which provide individual control of the speed of the selected motors in each step of the sequential operations of the control system. These dials, as indicated at 107, are all alike and all effect control of the speed of the selected motors in the same manner. An enlarged view of one of these dials is shown in FIG. 12.

FIG. 10 illustrates the rear panel of the console unit 45 and indicates three plug receptacles 108, 109 and 110 which are provided for connecting the motor leads to the console. Near the right-hand edge of the panel, there is a row of twelve plug receptacles 111 which are the receptacles or jacks in which the plugs for the limit switches are connected. Immediately above this row of plugs there is a plug receptacle, indicated at 112, which affords connection of the microswitches during "set up" of the machine tool and to the left of the receptacle 112 is a pilot light 113 which indicates closing of the switch plugged into 112. It will now be apparent that any one of the microswitch leads may be plugged into any one of the twelve plug receptacles or jacks on the rear of the console and will thereby be connected to provide a limit switch in the respective function or step of the cycle sequence.

Additional circuits, expanding the capacity of the control, can be added to the console and become an integral part of the control. These auxiliary circuits connect to the console at block 114, located on the back panel.

One or more accessory equipment control lines may be plugged into the console by means of plug receptacles or jacks mounted on a panel or block 115.

Figures 14, 15:
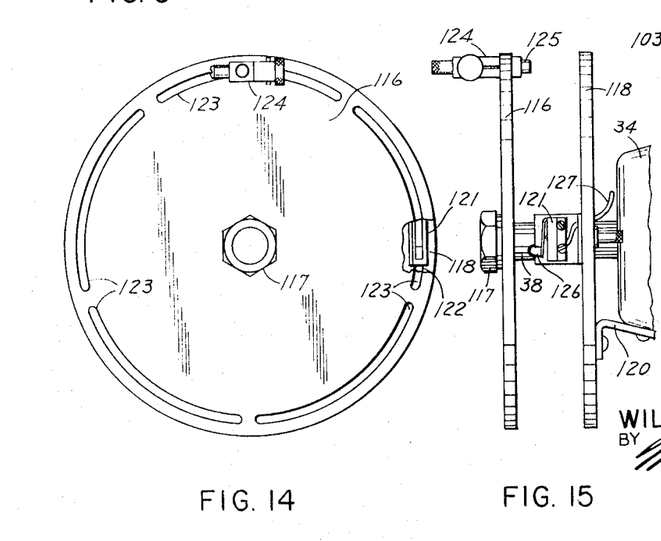
FIG. 14 is an end elevation view of a vernier limit switch mounting for the control system of FIG. 1.
FIG. 15 is a side elevation view of the mounting of FIG. 14.

For operation of a milling machine or the like to perform high precision work, a vernier limit switch actuating assembly is employed as illustrated in FIGS. 14 and 15. The vernier actuator comprises a disc 116 shown, by way of example, as mounted on the shaft 38 of the motor drive unit speed reducer 34 and secured thereto by a nut 117 so that the disc rotates with the shaft. A disc 118 of the same size as the disc 116 is rotatably mounted on the shaft 38 and held against rotation by a strap or torque bar 120 connected between the disc and the housing of the reducer 34, the shaft 38 thus being free to rotate with respect to the disc 118. A limit switch 121 of the same construction as the switches 53 of the linear guide assemblies is attached in a circumferential slot 122 near the outer periphery of the disc. The disc 116 has been illustrated as provided with five circumferential slots 123 in alignment and concentric with the slot 122 in disc 118. A switch actuating member 124 of the same construction as the actuator 50 of the linear guide assembly is mounted in one of the slots so that it engages and actuates the switch 121 once during each revolution of the disc 116, the actuator having a trip finger 125 which engages a roller 126 on the spring arm of the switch 121.

The switch 121 has a lead wire 127 which may be plugged into any of the twelve switch jacks on the back of the console so that it operates as a limit switch in the same manner as the limit switches of the linear guide assemblies.

The rotary vernier switch assembly is connected in the sequence circuitry so that when a linear feed switch has been actuated to advance the circuit sequence, the next function of the control will be stopped by activation of the rotary switch 121. This occurs during the first revolution of the feed screw and stops the machine in a precise location to complete a highly accurate cut of the workpiece in the direction of the selected working path of the machine. The vernier rotary switch thus acts in the same manner as a linear limit switch in one of the sequence steps of the control. By positioning the switch 121 and actuator 124 at a substantial distance from the axis of rotation highly accurate cuts may be made.

When it is desired to set up a milling machine or the like for automatic control by the system of this invention, the switch 97 in the left-hand column of the panel in FIG. 9 is moved to its left-hand position which is the position for manual operation of the system. The power is then turned on by turning the knob 95 through 90° to the right whereupon the pilot light 96 is energized to indicate that the power is on. The flow of vertical rows of pilot lights, dials and switches on the right-hand portion of the panel comprise 12 horizontal rows or sets of controls. Each of these rows provides the control setting for one function or step in the automatic cycle of the system. When the switch 97 is turned to its manual position, the automatic sequence control of the system will not advance automatically and the machine can be positioned by the operator using the controls in the top row comprising the pilot light 102, the dial 103, toggle switch 105 and dial 107. The dial 103 is then set to the axis along which the table 21 is to be moved with respect to the tool 14, the switch 105 is turned to the right or left depending upon the desired direction of movement along the selected axis and the dial 107 is set to the approximate desired speed. The feed rate controlled by the dial 107 may be adjusted while the control is in operation. The machine can now be moved by pressing the jog button 99.

By way of example, if a rectangular cut is to be made in the workpiece, the machine is positioned so that the tool is in the first corner of the rectangle. Dial 103 may then be set for travel along the Y-axis and the switch 105 to the negative travel position and the speed or advance selected by setting the dial 107. By pressing the jog switch, the Y-axis motor is actuated to move in the minus direction and moves the table along the Y-axis until the tool reaches the position of the next or second corner of the rectangle. The microswitch as represented by the switch 64 is then set in this position and the plug of the switch is inserted in a receptacle 112 so that when the switch closes the light 113 will be energized. In this manner, the switch may be set so that the light is energized when the slide 62 has reached the position of the corresponding second corner of the rectangle being cut. The dial 103 is then turned to the X-axis position and the switch 105 to the plus position, the jog switch 99 is then pressed and the table moves along the X-axis until the next or third corner of the rectangle is reached thereupon it is stopped and a second microswitch set in the same manner as the first switch, the first switch having been removed from the receptacle 112 and placed in the first plug receptacle below the receptacle 112. After the second switch has been set its plug is set in the plug position for the second step and the dial 103 is turned again to the Y-axis, the switch 105 being left in the plus position pressing the jog switch now moves the table along the Y-axis until the fourth corner of the rectangle is reached and another switch set in the same manner and its plug inserted in the third step position. The dial 103 is then set to the X-axis and the switch 105 to the minus position and the jog switch actuated to return the machine to the first corner of the rectangle where another microswitch is set and plugged into position four. This provides the desired setting of the microswitches for limiting the movement of the table.

The sequence dials below the top row are then set to conform to the set sequence of operations. For this purpose the top row of controls is set with the dial 103 in its Y position, the switch 105 to the minus position and the motor speed control set as desired, the second row is set with the dial 104 in its X+ position, TC switch 106 in its left-hand or "continue" position and the adjacent speed dial at the desired speed. In row three, the dial 104 is set in the Y+ position, TC switch in its left-hand position and the dial 107 at the desired speed. The fourth row of dials is set with the dial 104 in its X- position, the TC switch in its left-hand or continue position and the motor speed at the required setting. In the fifth row of dials, the TC switch is left in its center position which is the open position and terminates the sequence of functions or steps of the automatic cycle on completion of the fourth step. When switch 97 is moved to its right-hand position, which is the position for automatic cycling of the control, the machine will now operate automatically through the selected cycle each time the start button 100 is pressed.

If the vernier switch control shown in FIGS. 14 and 15 is to be used, the discs of the vernier are mounted on the shaft of the reducer unit of the motor to be employed and then at the end of the preceding linear switch cycle, the next control switch in order is the rotary vernier switch which is plugged into the next jack or receptacle and the dials of the corresponding function or step are set for the same motor and direction as the preceding row of controls, the motor speed being set lower if desired. When the vernier switch operates, the control proceeds automatically to the next step which has been set up in the next row of controls.

Figure 16:
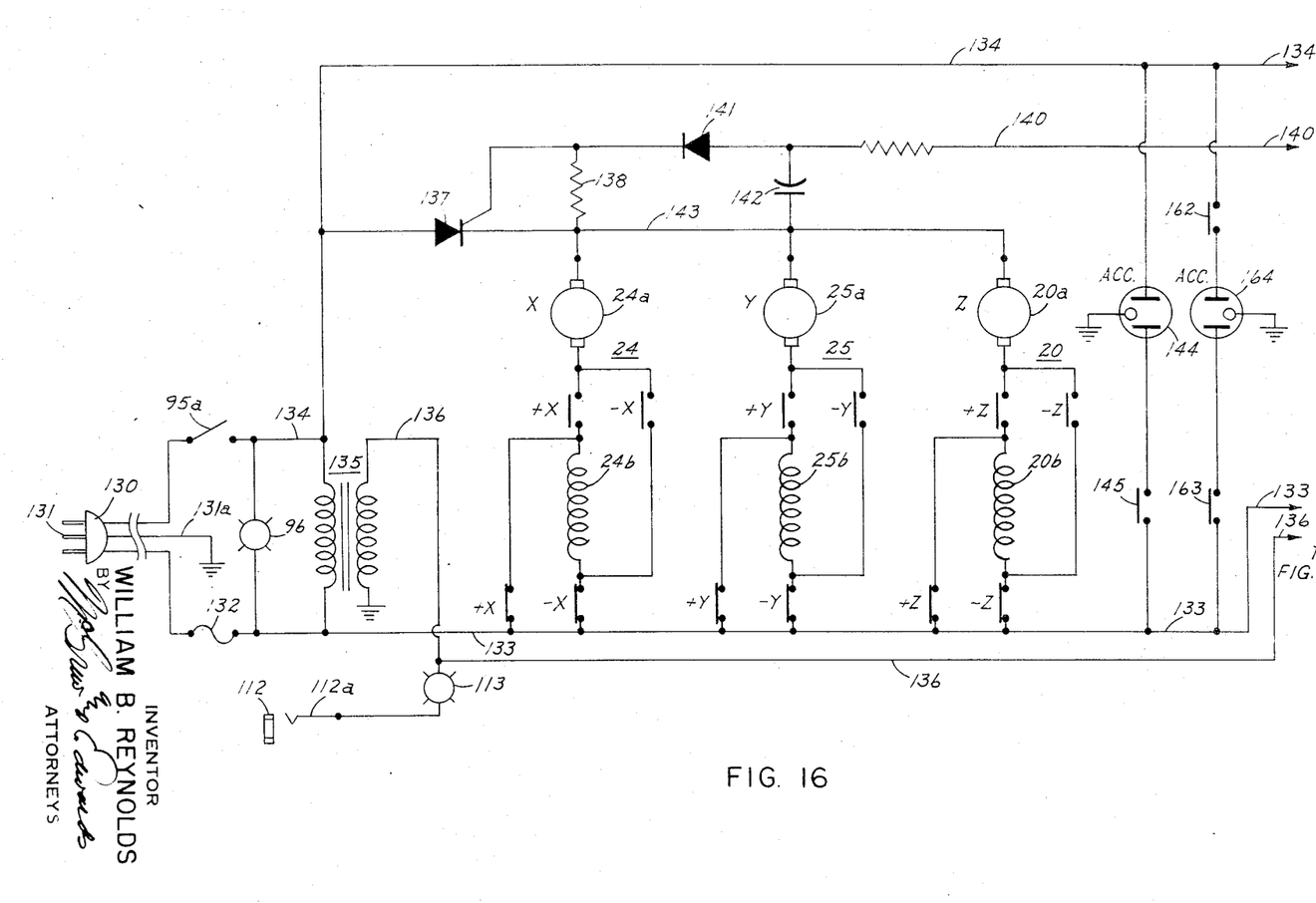
FIGS. 16, 17 and 18, taken together, constitute a schemmatic diagram of the control circuits for the system of the invention.
Figure 17:
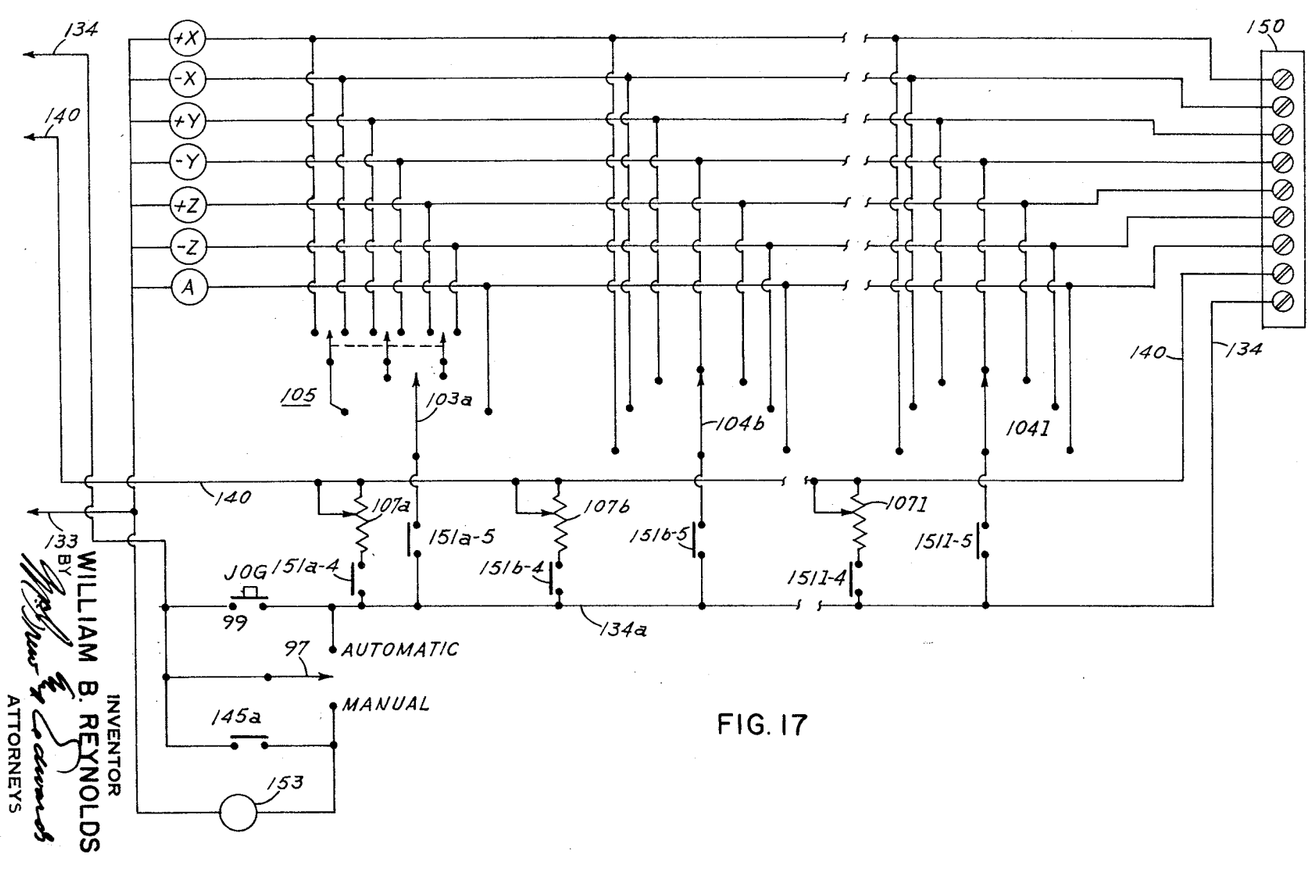
Figure 18:
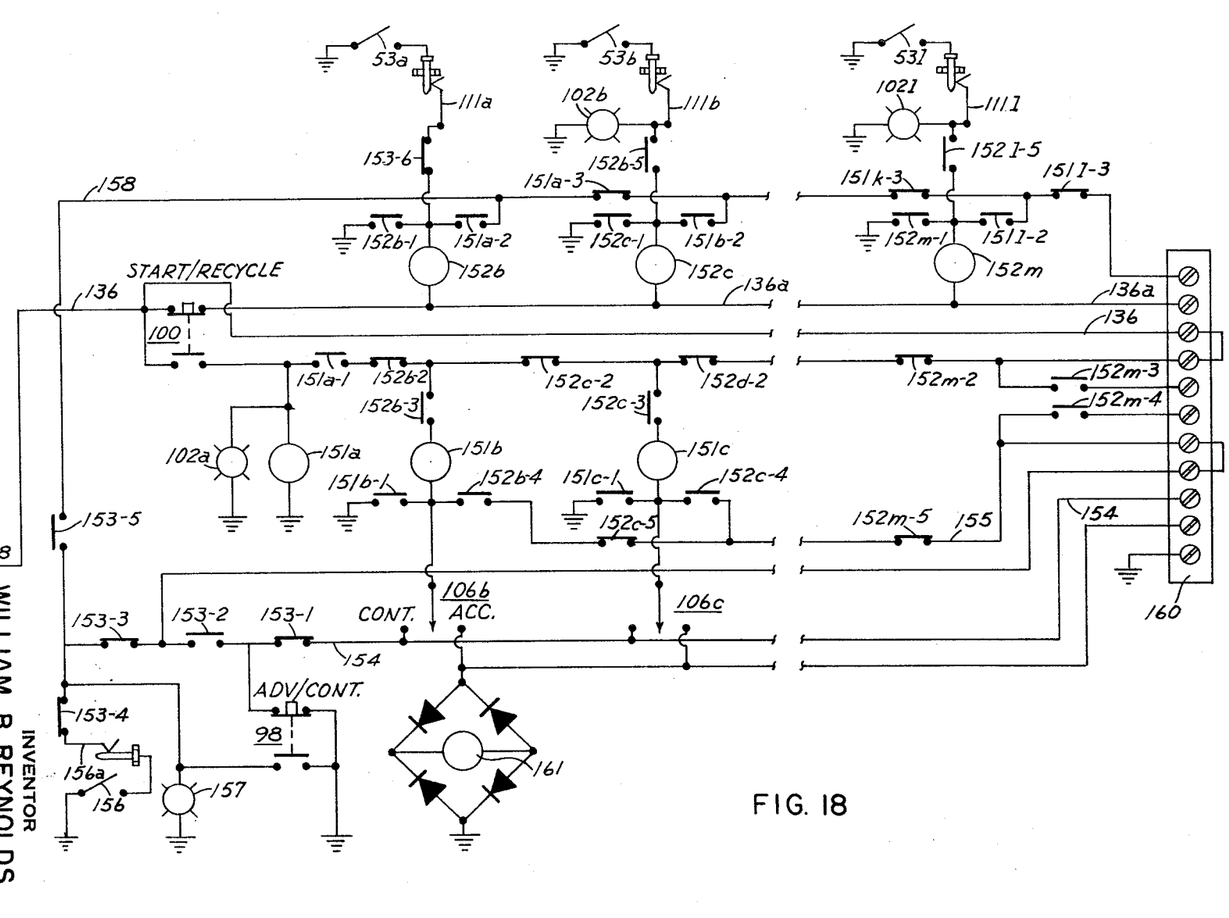

The electric circuitry for the control system of the invention is shown in the schemmatic diagram comprising FIGS. 16, 17 and 18. With reference to FIG. 16, the power for operation of the system is supplied through a plug 130 which is of the three prong type, the center prong 131 affording connection to the grounded lead of the power cable and being connected by a lead 131a to the metal structure of the machine which is thereby grounded. Power is supplied to the circuit by turning the dial control 95 which closes a switch 95a thereby energizing the pilot light 96 and indicating that the circuit is energized. A fuse 132 is connected in the lower supply line indicated at 133. The other side of the power line, as indicated at 134, extends across the upper portion of the circuit shown in FIG. 16. The primary winding of an isolation transformer 135 is connected between the leads 133 and 134 and the secondary is connected between ground and a control voltage supply line 136. A set-up pilot light 113 is connected between the line 136 and a contact element 112a of the jack 112. Each of the motors 24, 25 and 20 for driving the machine along the X-axis, the Y-axis and the Z-axis, respectively, comprise rotors 24a, 25a and 20a, respectively, and field windings 24b, 25b and 20b. The motors are DC motors and are reversed by reversing the field connections. The reversing switches comprise two normally open relay switches each connected between the rotor of the motor and a respective end of the field winding, and a pair of normally closed relay switches each connected between the line 133 and a respective end of the field winding. Upon operation of the relay for forward rotation of the motor, the normally open switch between the rotor and the upper end of the field coil is closed and the normally closed switch between the upper end of the field coil and the line 133 is opened, current then flows directly through the field winding from the rotor to the line 133. When the relay for reverse operation of the motor is energized, the normally open switch between the rotor and the lower end of the field winding is closed and the normally closed switch between the lower end of the coil and line 133 is opened, the current then flows from the lower end of the coil to the upper end of the coil thereby producing a field in the opposite direction from that for the first relay connection. The relay windings for actuating these reversing switches are shown in FIG. 17 as circles within each of which is a designation of the axis controlled and the direction along the axis, these being designated as +X, −X, +Y, −Y, +Z and −Z. To facilitate the identification of the reversing switches, each of the switches has been designated by the same letters and signs as the relays. Thus, the switches for the motor 24 are designated, +X and −X for both the normally open and normally closed relay contacts thereby indicating, by the plus and minus signs, the pairs of contacts which are operated simultaneously by their respective relays. The power supplied to the circuit is alternating current, and direct current for energizing the motors is provided through a silicon controlled rectifier 137 having a resistance 138 connected between its gate lead and its cathode lead; bias current is supplied through a line 140 having a diode 141 connected therein and a capacitor 142 connected between the control line 140 and the output line of the rectifier indicated at 143. The line 143 is connected to the upper terminals of the rotors of the motors. Only one of the motors is energized at a time by the selection of one of the six X, Y and Z relays; thus the silicon controlled rectifier 137 is connected to supply power into only one of the motors at a time. A three terminal plug receptacle 144 has two terminals connected to respective ones of the lines 133 and 134 and its third terminal connected to ground; normally open relay contacts 145 are provided between the line 133 and one terminal of the receptacle 144. These contacts are closed whenever the dial 104 of the active step of the control is set to its position indicated at A. This is the dial position for operation of an accessory device which is supplied with power through the receptacle 144, the right-hand position of each of the dials 104 being arranged to energize the lowermost relay indicated at A in the upper left-hand portion of FIG. 17. The supply lines 133, 134 and 140 are connected to the circuit portion illustrated in FIG. 17. In this figure, the switches 103, 104 and 105 are shown as rotary switches for selecting the X, Y, Z or A relay to be energized for each of the steps of the desired cycle of operation. Switch 103 is arranged to connect any one of the three contacts of the switch 105 and a contact for the A relay. The first three contacts of the switch 105 are connected with either the forward or reverse relays of all three motor controls. The switch 105 comprising three arms linked in tandem for movement together and which are shown in their neutral or open positions; when these contacts are moved to the right, they engage the forward relay terminals for each motor and in the opposite position the reverse terminals for each motor. Switches 104 select any one of seven terminals, one for each of the relays at the left of the figure. For purposes of simplifying the diagram, only two switches 104, the first and the last in the column of switches on the front panel of the console 45 have been illustrated, it being understood that the other nine switches are connected in the same manner to the same relay terminal lines and in positions between the two switches illustrated. Other portions of the circuit have been similarly simplified by the omission of intermediate elements. The motor speed adjusting dials 107 are connected to change the settings of potentiometers 107 with the suffix letters a to l, inclusive, the potentiometers 107 c through k being omitted in the drawing. Only one of the potentiometers is connected in the motor circuit at any one time under control of a sequencing relay system shown in FIG. 18. The switch 97 connects this relay system for automatic operation of the control when it is in its upper position and for manual operation when it is in its lower position. In this lower position, only the first step of the control, including the switch 105, the switch 103a and potentiometer 107a, can be connected for operation. In order to energize the motor in this lower or "manual" position of the switch 97, the normally open push button switch 99, the "jog" switch, is provided which enables the operator to manually energize the selected motor during the positioning of the cutting tool during the set up of the machine and system for automatic operation. The jog switch connects the power line 134 to an extension of this line indicated as 134a and which is connected for energization of the selected one of the potentiometers 107 a to l and also the selected relay, +X through A. A terminal strip 150 is provided and all of the lines of the motor connecting relays and the accessory relay A are connected to the strip together with the lines 134 and 140. This strip is provided so that additional motor selection and speed control circuits may be added if more than twelve sequential steps are desired. The strip 150 terminals are brought out to receptacles on the block 114.

The relay circuits for effecting an energization of the selected functions of the control in sequence are shown in FIG. 18. Power for these circuits is supplied from the secondary of the isolation transformer 135 through the line 136. Twelve motor and speed control energizing relays are provided, one for each step or function of the automatic cycle. The first three of these relays have been shown at 151a, 151b and 151c. The circuits for the relays 151b and 151c are identical and the remaining circuits of the series of twelve are the same. A series of twelve automatic sequencing relays from 152b through 152m have been indicated, the intermediate remaining relays of this series being arranged between the relays 152c and 152m have been omitted, the omitted relays not being essential to an understanding of the invention since the operation is the same as that of the relays 152b and 152c. Switches actuated by the relay immediately preceding the relay 152 m and which are connected in the circuits associated with the relay 152m have been designated by the postscript letter *l*. The relay switches have been illustrated in their normal or nonenergized positions, the switches shown open being normally open switches and those shown closed being normally closed switches.

THE SET UP OPERATION

As indicated above in connection with the setting up of the machine for automatic operation, the manual switch 97 is closed and, as shown in FIG. 17, this energizes a relay 153 which moves all the associated relay switches to their operated positions. These switches are shown in FIG. 18 at 153-1 through 153-5, inclusive. The switch 153-1 opens so that a supply line 154 connected to the continuous automatic operation positions of the switches 106 cannot be energized. The switch 153-2 is closed and the switch 153-3 is opened to connect a line 155 to ground through the normally closed position of the switch 98, switch 153-4 is opened to disconnect an external switch 156 and the switch 153-5 is closed to connect an indicating pilot light 157 to a line 158 for energization upon actuation of the 151a relay. When the start button 100 is pressed, the relay 151a is energized together with a light 102a and the 151a relay switches indicated at 151a-1, 151a-2, 151a-4 and 151a-5, the latter two contacts being shown in FIG. 17, are actuated from their normal positions. The 151a-1 relay on closing provides a holding circuit for the relay 151a through a series of normally closed relay switches through the line 136. The normally open contacts 151a-2 are closed and this provides a circuit through the 152b relay, the line 158 switch 153-5 and the "advance" light. The resistance of the advance light is sufficiently high that the relay 152b is not actuated. Switch 151a-3 opens disconnecting the line 158 from the remaining sequencing circuits. The switches 151a-4 and 151a-5 close preparing a circuit from the line 134 and switch 89 through the speed control potentiometer 107a and the switches 103a and 105. Thus, the selected one of the motor relays is energized whenever the jog switch 99 is closed, this provides for selected operation of the motors under control of the switch 99. Thus, when the manual switch 97 is closed to its manual position and relay 153 energized, the first functional step of the control comprising the top row of control elements 103, 105 and 107 may be employed to operate the machine and is also employed in the set up of the machine as previously described.

THE AUTOMATIC OPERATION

For the full automatic operation of the control system, switch 97 is moved to its upper or automatic position. This connects the power line 134 to the line 134a and makes power available for energizing the motors and speed control potentiometers through the switch 103 and the series of switches 104 *b* through *l*. When the cutter of the machine is in its first position ready to start, the start switch 100 is pressed and energizes the relay 151a and its associated switches are moved from their normal positions to their actuated positions. The switch 151a–l closes a holding circuit from the line 136 through the series of normally closed switches to the right of the switch 151a–l and after release of the starting switch 100 the relay 151a remains energized. The switches 151a–4 and 151a–5 are closed and the motor selected by the switches 103 and 105 is energized and the speed control potentiometer 107a biases the silicon controlled rectifier 137 for the selected speed of the motor. When workpiece and table 21 have moved relatively to the milling cutter 14, a distance determined by the setting of the microswitch 53a and the switch is closed and the relay 152b is energized thereby closing a holding switch 152b–1 and opening a normally closed switch 152b–2 thereby de-energizing the relay 151a and stopping the motor. Operation of the relay 152b also closes a switch 152b–4 and closes a switch 152b–5 to prepare an energizing circuit for the next function and to energize the pilot light 102b which has sufficient resistance to prevent energization of the next relay 152c. The closing of relay switch 152b–3 connects a relay 151b to be energized from the line 136 a series of normally closed switches and through the left-hand contacts of the switch 106, the line 154 switch normally closed switch 153–1 and the upper contacts of the switch 98 to ground. Energization of the relay 151b closes a holding circuit through a switch 151b–1 and closed switch 152b–4 to complete the circuit through the series of normally closed switches in the line 155 and normally closed switch 153–3 and the light 157 to ground; the switch 151b–2 is closed by operation of the 151b relay and is effective in the same manner as the switch 151a–2 of the second function so that during manual operation of the system the next 152 relay may be energized and thus release the preceding step and continue the operation manually in the second step. The advance is effected by closing the switch 98.

The actuation of the 151b relay also closes the two motor control switches 151b–4 and 151b–5 and the selected motor is operated at the selected speed until the microswitch 53b is closed whereupon the relay 152c is energized thereby closing the holding contacts 152c–1 and opening the contacts 152c–2, de-energizing and releasing the 151b relay. Energization of the relay 152c closes contacts 152c–3 and 152c–4, closing of the contacts 152c–3 completing energization of the relay 151c provided the switch 106c is in its left-hand or "continue" position. Actuation of the relay 151c closes holding contacts 151c-1 and energizes the corresponding motor and potentiometer connected with the next selector switch 104, (not illustrated in the drawings). Additional relay contacts are provided in the function step next to the third step or step "C" these including contacts corresponding to the contacts 152b- 5.

The subsequent steps are all of the same circuit arrangement as the second and third steps here designated for convenience as the "B" and "C" steps, respectively; a portion of the circuitry required for connecting a further series of steps and which includes the circuitry for interrupting the final or "L" step of the present series of steps has been illustrated in the upper right-hand portion of FIG. 18. This circuitry includes the final limit switch 53-l, its plug connection 111-l, pilot light 102-l and normally open switch 152-l-5, a relay 152m is also provided having contacts 152m-1 through 5, inclusive. This relay is energized upon closing of the final limit switch 53-l and opens contacts 152m-2 to de-energize the preceding motor relay. Additional contacts illustrated are relay contacts 151k-3 and 151-l-3 which perform the same respective functions as the relay 151a-3 of the first step. A terminal strip 160 is provided for use in the event of the addition of further steps or functions. This strip provides the return connections for the leads 136 and 155 and also the terminals for the other functions of the circuit as indicated.

In the operation of the automatic system as illustrated, the functions will proceed successively step by step provided the switch 106 for each function is in its left-hand or "continue" position. If it is in the central position as illustrated, the operation will stop when the microswitch 53 for that function is closed. Whenever an operation comprising a cycle of functions has been completed, the machine is returned to its starting position and will proceed through the cycle again when the start switch 100 is pressed. The actuation of this switch de-energizes all of the 152 relays and the system is restored to its starting condition, simultaneously with the energization of the relay 151a.

At any time during a cycle that a tool change is required, the cycle may be interrupted by turning a switch 106 to its center or open position. After being interrupted by a tool change, the automatic cycle may be continued by manually activating switch 98. The third position of the switches 106 is a position for connecting accessory or auxiliary control equipment for operation at the selected step in the cycle. When the switch 106 is moved to its right-hand position, the operation of the 152 relay closes the corresponding 152–4 contacts and power is supplied through the lead 155 and the normally closed switches to a relay 161; this relay is arranged in a diode square so that current always passes through the relay in the same direction. Energization of this relay closes normally open contacts 162 and 163 in FIG. 16 and energizes the terminals of an accessory plug indicated at 164, power is thereby supplied to an accessory device plugged into the receptacle 164. On the termination of the operation cycle of the accessory device, the system may be restored to continue its automatic operation by actuation of the external "continue" switch 156 by the accessory device at the conclusion of its cycle of operation when plugged into its jack indicated at 156a. The operation of the switch 156 grounds the corresponding 151 relay through the line 155 and switches 153–3 and –4 and the normally closed switches in line 155 to start the feed motor and continue the operation of the system.

From the foregoing, it will be seen that each of the functions or steps of the system will operate in the same manner. In each case, the 151 relays control the operation of the feed motors and each 152 relay turns off or deenergizes the preceding 151 relay, energizes its corresponding 151 relay and sets up the following 152 relay so that upon operation of the next microswitch 53, the following 152 relay will be activated. The relays may be operated only in a forward sequence and the action of each sequence is determined by the settings of the control dials and switches on the console and by the selection and connection of the required microswitches 53.

I claim:

1. In an automatic control system for a machine tool including a base member and means for moving a cutting tool and a workpiece relatively to one another in a plurality of paths in transverse directions, said moving means including a plurality of carrier members and feed means for moving the members with respect to one another and with respect to the base member,
 means including a plurality of reversible motors for actuating the feed means and thereby moving the tool and workpiece relatively to one another in the respective transverse paths,
 means including a plurality of independently actuatable switches and respective, individual circuits associated therewith each for preparing any selected one of said motors for energization to actuate the feed means and drive the cutting tool and workpiece relatively to one another in the predetermined paths and in either direction of movement of the motor, said circuits being connected for individual energization and operation in succession in a predetermined order and each circuit when operated preparing the next succeeding circuit for energization,
 means dependent upon the successive energization of said circuits for energizing successively selected ones of said motors to move the cutting tool and workpiece relatively to one another in the respective paths,
 means for de-energizing each selected motor upon the traversing of a predetermined length of the respective working path, and
 manual selector switch means for preventing energization of any of said motors at the end of any selected number of energizations of said motors.

2. An automatic control system for a machine tool as set forth in claim 1, including an individual motor speed control device associated with each respective one of said circuits and means for adjusting each said device to effect a selected speed of the selected motor.

3. An automatic control system for a machine tool including a base member and means for moving a cutting tool and a workpiece relatively to one another in a plurality of paths in transverse directions, said moving means including a plurality of carrier members and feed means for moving the members with respect to one another and with respect to the base member,
 means including a plurality of reversible motors for actuating the feed means and thereby moving the tool and workpiece relatively to one another in the respective transverse paths, means including a plurality of independently actuatable switches and circuits connected therewith each for preparing any selected one of said motors for energization to actuate the feed means and drive the cutting tool and workpiece relatively to one another in the predetermined paths and in either direction of the motor, means for energizing successively selected ones of said motors to move the cutting tool and workpiece relatively to one another in the respective paths, means for de-energizing each selected motor upon the traversing of a predetermined length of the respective working path, and manual selector switch means for preventing energization of any of said motors at the end of any selected number of energizations of said motors, each of said feed means including a rotatable member and each of said de-energizing means comprising a switch and actuating means for the switch connected to move with respect to one another in accordance with movement of a respective one of said feed means to actuate the switch at the end of a predetermined path of movement of the feed means, at least one of said de-energizing means comprising an element mounted for rotation with one of said rotatable members and means dependent upon rotation thereof for actuating the switch of said one de-energizing means once during each revolution of said one rotatable element, said one de-energizing means when connected to de-energize a motor effecting the de-energization thereof during the first revolution of said rotatable element after energization of the respective motor.

4. An automatic control system for a machine tool as set forth in claim 3 including means for adjusting the switch and actuating means of said one de-energizing means angularly with respect to one another about the axis of rotation of said element.

5. An automatic control system for a machine tool as set forth in claim 3 wherein said rotatable element comprises a plate attached to said rotatable member for rotation in a plane normal to the axis of rotation of said member, a stationary support mounted adjacent said plate, a switch secured to said support, and an actuating finger mounted on said plate for actuating said switch once in each revolution of said plate, said plate having an arcuate slot concentric with the axis of rotation of the plate and said finger being adjustably mounted on said plate for positioning along said slot.

6. An automatic control system for a machine tool including a base member and means for moving a cutting tool and a workpiece relatively to one another in a plurality of paths in transverse directions, said moving means including a plurality of carrier members and feed means for moving the members with respect to one another and with respect to the base member, means including a plurality of reversible motors for actuating the feed means and thereby moving the tool and workpiece relatively to one another in the respective transverse paths, means including a plurality of independently actuatable switches and circuits connected therewith each for preparing any selected one of said motors for energization to actuate the feed means and drive the cutting tool and workpiece relatively to one another in the predetermined paths and in either direction of the motor, means for energizing successively selected ones of said motors to move the cutting tool and workpiece relatively to one another in the respective paths, means for de-energizing each selected motor upon the traversing of a predetermined length of the respective working path, and manual selector switch means for preventing energization of any of said motors at the end of any selected number of energizations of said motors, said de-energizing means for each motor comprising a rigid guide track for mounting on a respective one of said members and having a slide movable along the track and switch means adjustable for actuation at selected positions of said slide on the track, each de-energizing means including a flexible rod for connection between the slide and a respective member movable relatively to the member on which the respective track is mounted to effect movement of the slide along its track, said flexible rod affording effective actuation of the slide regardless of slight misalignments of said track with the path of travel of the relatively movable members.

7. An automatic control system for a machine tool including a base member and means for moving a cutting tool and a workpiece relatively to one another in a plurality of paths in transverse directions, said moving means including a plurality of carrier members and feed means for moving the members with respect to one another and with respect to the base member, means including a plurality of reversible motors for actuating the feed means and thereby moving the tool and workpiece relatively to one another in the respective transverse paths, means including a plurality of independently actuatable switches and circuits connected therewith each for preparing any selected one of said motors for energization to actuate the feed means and drive the cutting tool and workpiece relatively to one another in the predetermined paths and in either direction of the motor, means for energizing successively selected ones of said motors to move the cutting tool and workpiece relatively to one another in the respective paths, means for de-energizing each selected motor upon the traversing of a predetermined length of the respective working path, and manual selector switch means for preventing energization of any of said motors at the end of any selected number of energizations of said motors, said system including a control housing having arranged therein said independently actuatable switches and circuits and respective plug receptacles therefor and said energizing means and said manual selector switches, and wherein said de-energizing means comprises readily removable and adjustably positionable limit switches each having an extended flexible lead wire and a detachable plug for connecting each said limit switch to a selected one of said plug receptacles of said independently actuatable switches and its connected circuit for stopping the operation of the respective motors.

8. An automatic control system for application to a machine tool including a cutting tool and driving means for actuating the cutting tool and two relatively movable carrier members and power feed means therefor for moving the cutting tool and a workpiece with respect to one another along a predetermined path, said system being adapted for installation on the machine tool without modification of the structure thereof, said system comprising means for starting the operation of the feed means, means for stopping the operation of the feed means, -aid stopping means including a rigid straight line guide track adapted to be attached to one of the members of the machine and having a slide thereon and a flexible rod for connection between said slide and the other of the members for movement of the slide along said guide track upon relative movement of the members, said flexible rod affording accurate and effective movement of said slide regardless of slight misalignment of said guide structure with respect to the path of relative movement of the members, and adjustable switching means actuated by relative movement of said slide and said guide structure to a pre-selected position for actuating said stopping means.

9. An automatic control system for application to machine tools as set forth in claim 8, wherein said feed means comprises a rotatable feed screw and including a rotatable switch means comprising a rotatable member mounted on said feed screw at one end thereof and a stationary member and switching means mounted on one of said members and having an actuating element on the other of said members for closing said switch once in each revolution of said feed screw, said switching means being located at a substantial radial distance from the axis of said feed screw, and circuit means for utilizing said rotary switch means for stopping the operation of the feed means and for connecting said rotary switch means for controlling movement of said carrier members along the same path as said first mentioned operation of the feed means whereby said rotary switch acts as a vernier control for stopping the operation of said feed screw in a precise location.

10. An automatic control system for application to a machine tool including a base member and a plurality of relatively movable carrier members and driving means for actuating a cutting tool and feed means for moving the members selectively in a plurality of directions with respect to one another, said system comprising, a plurality of reversible motors each for mounting on and actuation of one of the feed means of the machine and for moving respective members relatively to one another thereby moving the tool and a workpiece relatively to one another in a respective one of a plurality of transverse paths, a control unit comprising:

means including a series of independently actuatable switches each for preparing any selected one of said motors for energization to drive the cutting tool and workpiece with respect to one another in either of the directions of the motor, automatic cycling means including a first individual circuit for utilizing the first switch of said series for starting one of said motors to drive the cutting tool and workpiece with respect to one another along a first working path, means dependent upon operation of a respective feed means of the machine for de-energizing and stopping said one motor upon the traversing of a predetermined length of said first path, said cycling means including successive individual circuits each including means dependent upon movement of a respective feed means for utilizing the second switch in said series and each successive switch in turn and for de-energizing each respective selected motor before the energization of the next succeeding selected motor and for operating each respective selected motor upon utilization of each successive switch to move the cutting tool and workpiece with respect to one another over a predetermined length and direction of path upon each energization, and means for preventing the energization of any of said motors at the end of a selected cycle comprising the successive utilization of a plurality of the individual switches of said series.

11. An automatic control system as set forth in claim 10, including an individual motor speed control device associated with each respective one of said circuits and means for adjusting each said device to effect a selected speed of the selected motor.

12. An automatic control system as set forth in claim 10 including respective selectively actuatable switch means connected to prevent the energization of said second switch and each successive switch for interrupting operation of said cycling means.

13. An automatic control system as set forth in claim 10 including manual switch means effective after operation of said selectively actuatable switch means to interrupt said cycling means for restoring the operation of said cycling means.

14. An automatic control system for application to a machine tool as set forth in claim 10, including a housing for said control units and wherein said de-energizing and stopping means comprises individually locatable unit switches and flexible leads for connecting said switches and said unit and having detachable plugs for connection with said unit for readily connecting any of said limit switches to control the circuit of any of said independently actuatable switches.

15. An automatic control system for application to a machine tool including a base supporting a cutting tool and driving means for actuating the cutting tool and two relatively movable carrier members and a rotatable power feed screw mounted on one of said members for moving the members with respect to one another along a predetermined path, said system comprising:

a motor unit for driving said feed screw, said unit having a rotatable drive shaft, a readily detachable adapter coupling securing said shaft to said feed screw in alignment with the axis of rotation thereof for driving said feed screw, means for starting the operation of said motor unit to drive the feed screw, and means for stopping the operation of said motor unit, said stopping means comprising a rigid guide track for mounting on one of said members and having a slide movable along the track and switch means adjustable for actuation at selected positions along the track, and a flexible rod for connection between the slide and the other of said members to effect movement of the slide along the track, said flexible rod effecting actuation of the slide regardless of slight misalignments of said track with respect to the path of travel of said members with respect to one another.

* * * * *